United States Patent
Bose et al.

(10) Patent No.: US 8,402,138 B2
(45) Date of Patent: Mar. 19, 2013

(54) METHOD AND SYSTEM FOR SERVER CONSOLIDATION USING A HILL CLIMBING ALGORITHM

(75) Inventors: Sumit Kumar Bose, Delhi (IN); Srikanth Sundarrajan, Chennai (IN)

(73) Assignee: Infosys Technologies Limited (IN)

( * ) Notice: Subject to any disclaimer, the term of this patent is extended or adjusted under 35 U.S.C. 154(b) by 413 days.

(21) Appl. No.: 12/420,225

(22) Filed: Apr. 8, 2009

(65) Prior Publication Data

US 2009/0287823 A1 Nov. 19, 2009

(30) Foreign Application Priority Data

Apr. 8, 2008 (IN) .............................. 879/CHE/2008

(51) Int. Cl.
*G06F 15/173* (2006.01)

(52) U.S. Cl. ...................................................... 709/226

(58) Field of Classification Search .................. 709/223, 709/225, 226
See application file for complete search history.

(56) References Cited

U.S. PATENT DOCUMENTS

| | | | |
|---|---|---|---|
| 6,941,365 B2* | 9/2005 | Sirgany | 709/223 |
| 2003/0074387 A1* | 4/2003 | Tanaka | 709/103 |
| 2006/0206478 A1* | 9/2006 | Glaser et al. | 707/5 |
| 2007/0300239 A1* | 12/2007 | Adam et al. | 719/320 |

OTHER PUBLICATIONS

"Maths—Angles between vectors" Downloaded from <http://www.euclideanspace.com/maths/algebra/vectors/angleBetween/index.htm>.*

"Maths—Reverse Trigonometric Functions" Downloaded from <http://www.euclideanspace.com/maths/geometry/trig/inverse/index.htm>.*

* cited by examiner

*Primary Examiner* — Scott Christensen

(74) *Attorney, Agent, or Firm* — Lerner, David, Littenberg, Krumholz & Mentlik, LLP

(57) ABSTRACT

A system and method for consolidating a plurality of resources on a plurality of data processing units (DPUs) in a data processing network is provided. The method includes selecting a first DPU having a highest DPU volume among the plurality of DPUs. The method further includes calculating an angle made by a first DPU vector of the first DPU with a horizontal dimension of a multi-dimensional chart using first DPU co-ordinates from the plurality of DPU co-ordinates. Further, the method includes calculating an angle made by a first resource vector of a first resource to be assigned to the first DPU with a horizontal dimension of the multi-dimensional chart. Thereafter, the first resource is assigned to the first DPU, when a deviation of the first resource vector from the first DPU vector is minimum among the plurality of resources.

30 Claims, 8 Drawing Sheets

Sort the bins in the bin-list in the decreasing order of volumes (CPU*memory) and calculate its |memory/cpu<sub>i</sub>| ⎱ 702 for(i=0; i<=bin-list.length;i++)
{
    j=0;
    while(j<=item-list.length)
    {
        Let J<sub>i</sub> be the set of items packed into bin i. ⎱ 704

For all the items, j' in the item list (item list always contains items that are yet to be allocated to the bins) calculate M<sub>i</sub>.
Sort item list in the descending sequence of θ<sub>i'</sub>

If (j can be packed in to bin i)
        {
            Pack item j into bin i.
            Update item-list by removing j from the item-list.
            Also update J<sub>i</sub>.
        }
        Else
        {
            Increment j.
        }
    }
}
⎱ 706

FIG. 7

METHOD AND SYSTEM FOR SERVER CONSOLIDATION USING A HILL CLIMBING ALGORITHM

FIELD OF INVENTION

The present invention relates generally to the field of server consolidation. More particularly, the present invention provides for consolidating a plurality of resources among multiple servers using a hill climbing algorithm.

BACKGROUND OF THE INVENTION

Business organizations and educational institutions need data to be accessed by multiple individuals concurrently. One of the methods of achieving concurrent data access by storing the data on servers. Servers can generally be defined as computers with large computing power and memory, which can service multiple clients at the same time. With an increase in number of concurrent accesses, the number of servers for storing data increases. This phenomenon gives rise to a problem called 'server sprawling'.

Server sprawling is common in data centers of business organizations. Server sprawls are characterized by the use of dedicated servers for single applications. This leads to situations where the business organizations end up having numerous servers that remain under-utilized most of the times. The servers, in such scenarios, are allocated more resources than are justified by their present workloads. As business organizations invest substantial amounts of money in these data centers, most business organizations are looking towards server consolidation for trimming unnecessary costs and maximizing their returns on investment. Consolidating multiple under-utilized servers into small number of servers is an effective tool for businesses to enhance their return on investment.

Consolidation helps eliminate Information Technology (IT) redundancies, achieve increased asset utilization, reduce operational, and maintenance costs. However, consolidation is often done manually after analyzing the historical workload pattern of the servers. One method existing in the art describes a high dimensional probabilistic bin packing model for the server consolidation problem. Another method in the art describes heuristic techniques for improving the Least Loaded (LL) and the First Fit Decreasing (FFD) algorithms for reducing the number of destination servers. However, the existing methods in the art involve a lot of manual effort. The manual efforts involved include the analysis of historical workload patterns. Manual efforts are time consuming, error prone, and are dependent on the subjective assessment of the decision maker.

Consequently, there is a need for a method and a system for consolidation of servers without manual labor. Additionally, there is a need for a method and system that consolidates the servers with an accuracy that is not possible with manual interference.

BRIEF SUMMARY OF THE INVENTION

A method and system for assigning multiple resources to multiple data processing units is provided. In an embodiment of the present invention, the data processing units are servers servicing clients requesting for resources.

In various embodiments of the present invention, the method includes selecting a first data processing unit (DPU) having a highest DPU volume among the plurality of DPUs in the data processing network. The DPU volumes for each of the plurality of DPUs are calculated using a set of DPU co-ordinates that define the sizes of each of the plurality of DPUs. Further, the method includes calculating an angle made by the DPU vector of the first DPU with a horizontal dimension of a multi-dimensional chart using DPU co-ordinates from the plurality of DPU co-ordinates that define the first DPU. Further, the method includes assigning a resource to the first DPU, when a deviation of the resource vector from the DPU vector is minimum among the plurality of resources.

In an embodiment of the present invention, deviation for assigning a resource to a DPU is calculated by subtracting an angle formed by the resource vector with a horizontal dimension of a multi-dimensional chart from the angle made by the DPU vector with the horizontal dimension.

In another embodiment of the present invention, the method and system for includes normalizing each of the plurality of DPUs with a reference DPU before selecting a first DPU for assigning multiple resources to multiple data processing units. Normalization of each DPU may include using an equivalence factor, wherein the equivalence factor is calculated using at least one of a plurality of parameters comprising Central Processing Unit (CPU) cores, CPU sockets, and clock frequency of each DPU and the reference DPU.

In yet another embodiment of the present invention, a second DPU from the plurality of DPUs for assigning resources is selected when at least one of the first DPU co-ordinates of the first DPU have been utilized to a user defined level.

BRIEF DESCRIPTION OF THE DRAWINGS

The present invention is described by way of embodiments illustrated in the accompanying drawings wherein:

FIG. 7 illustrates a pseudo code for the algorithm for assigning multiple items to multiple bins.

DETAILED DESCRIPTION

A system and method for server consolidation using a hill climbing algorithm is provided. The present invention is more specifically directed towards consolidating a plurality of resources among a plurality of Data Processing Units (DPUs). An exemplary scenario in which the present invention may be implemented is automatic consolidation of multiple applications among multiple servers, such that the servers are utilized optimally.

In an embodiment of the present invention, the system and method implements an optimization algorithm that provides selecting a DPU from a plurality of DPUs and forming a DPU vector representing values of DPU sizes in a multi-dimensional form on a Cartesian co-ordinate system. Further, the system and method provides selecting a resource and forming a resource vector representing values of resource sizes in a multi-dimensional form.

In another embodiment of the present invention, the system and method disclosed provides determining the deviations of a resource vector from a DPU vector in order to assign the resource vector to the DPU.

In yet another embodiment of the present invention, the system and method disclosed provides selecting each DPU and assigning a resource to each DPU optimally.

Hence, the present invention enables an automatic consolidation of resources among multiple servers using an optimization algorithm. The present invention also enables the elimination of Information Technology (IT) redundancies in organizations and helps in achieving increased asset utilization, and reducing operational and maintenance costs.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
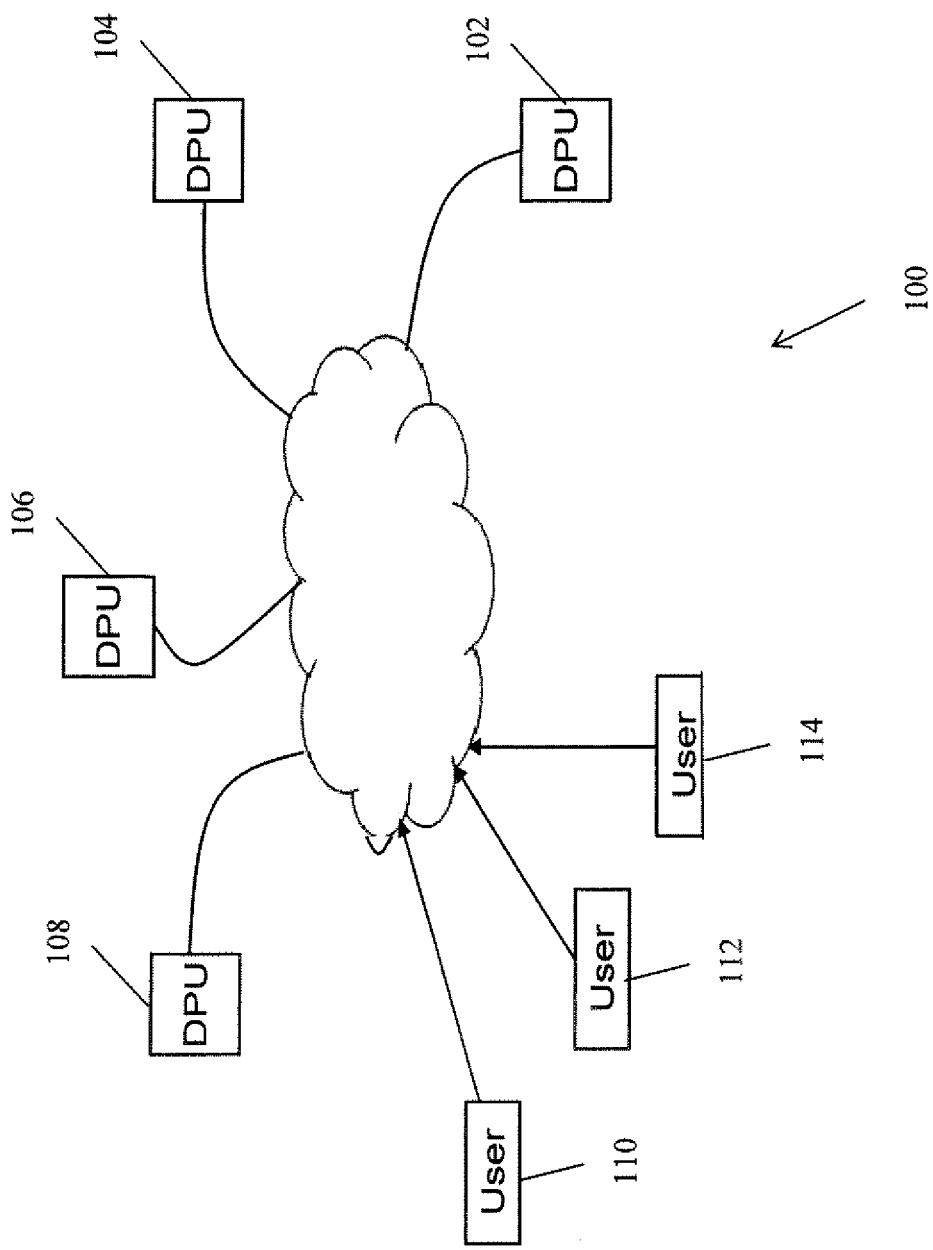
FIG. 1 illustrates an exemplary data processing network in which the present invention may be practiced.

FIG. 1 illustrates an exemplary data processing network 100 in which the present invention may be practiced. The figure illustrates the network 100 comprising data processing units (DPUs) 102, 104, 106 and 108 and users 110, 112 and 114. In an embodiment of the present invention, the users 110, 112 and 114 are clients located at geographically different locations and the DPUs 102, 104, 106 and 108 are servers servicing the clients. The users 110, 112 and 114 connect to the network 100 to gain access to resources stored in the DPUs 102, 104, 106 and 108. The DPUs can be, for example, but not limited to, computer servers, personal computers, laptops etc. The resources required by the users 110, 112 and 114 may be, for example, but not limited to, a data repository, a software application, executable files etc. In an embodiment of the present invention, the resources needed by the users 110, 112 and 114 may be stored only on the DPUs 102 and 104. In such a scenario, the DPUs 102 and 104 might be over-utilized. In an embodiment of the present invention, utilization of a DPU may be described by the utilization of Central Processing Unit (CPU) of the DPU. In an example, CPU utilization may be defined by the amount of time, when the CPU is not in idle mode. Thus percentage CPU utilization may be expressed as (100%−(% of time spent by a CPU in idle task)). Since, the users 110, 112 and 114 access only the DPUs 102 and 104, the DPUs 106 and 108 remain under-utilized. In an embodiment of the present invention, the DPUs 106 and 108 are assigned resources, such that the DPUs are optimally utilized.

Figure 2:
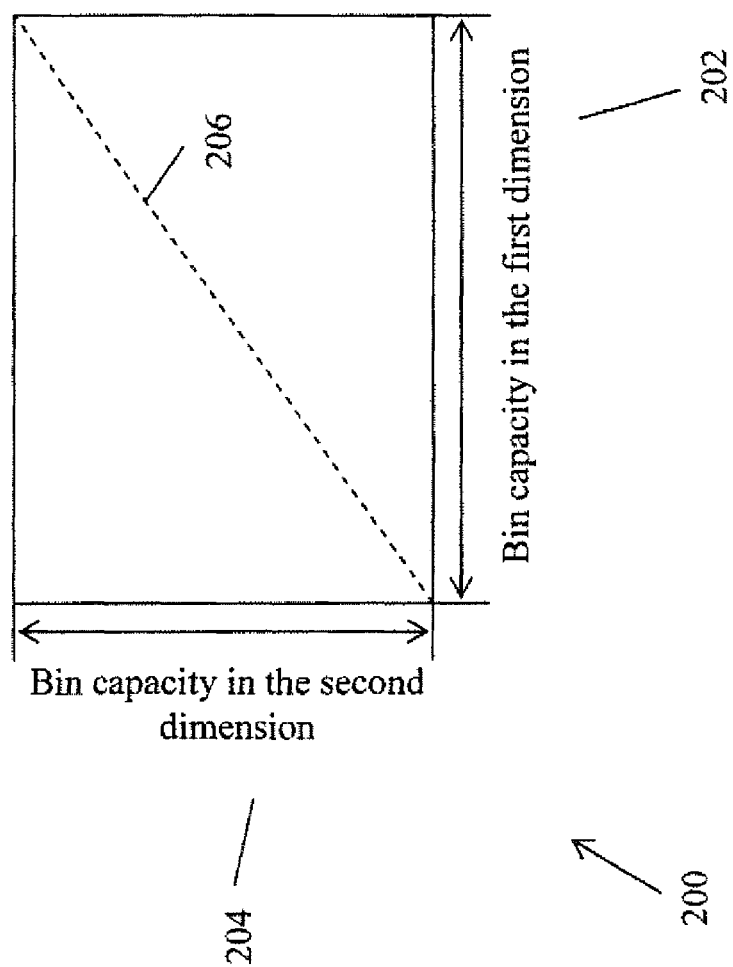
FIG. 2 illustrates an orthotope representing bin capacity in a Cartesian co-ordinate system.

FIG. 2 illustrates an orthotope 200 representing bin capacity in a Cartesian co-ordinate system. In various embodiments of the present invention, server consolidation can be considered synonymous with the problem of packing multiple items in multiple bins optimally. In the context of server consolidation, packing multiple items in multiple bins corresponds to assigning multiple resources to multiple servers. For the sake of simplicity in description, we assume that each of the bins and items are two-dimensional in nature, i.e., the bins and items are described by a set of bin sizes and item sizes that are two-dimensional. A current bin from the multiple bins is selected based on volumes of the multiple bins. In an embodiment of the present invention, the bin selected as the current bin has the highest volume amongst the multiple bins. The volume of each bin is calculated by using the set of bin sizes. In an example, a two-dimensional bin size may be a bin size represented by height in first dimension and width in the second dimension. Values of sizes of the current bin selected from the multiple bins are plotted on a Cartesian co-ordinate system values in one of the dimension being represented on the horizontal dimension (axis) of the co-ordinate system and the values in the other dimension being represented on the vertical dimension (axis) of the co-ordinate system. The orthotope 200 is formed by joining values representing the current bin size to the dimensions of the co-ordinate system, as shown in the figure. An orthotope is a rectangular representation of a multi-dimensional object. The origin of the co-ordinate system forms one vertex of the orthotope. Bin capacity in the first dimension 202 represents capacity of the bin in one dimension, for example, height. Similarly, bin capacity in the second dimension represents capacity of the bin in another dimension, for example, width. As shown in the figure, origin of the Cartesian co-ordinate system is joined with the bin size to form a bin vector 206. The bin vector 206 represents values of bin capacity in the first dimension and the second dimension on the Cartesian co-ordinate system.

Figure 3:
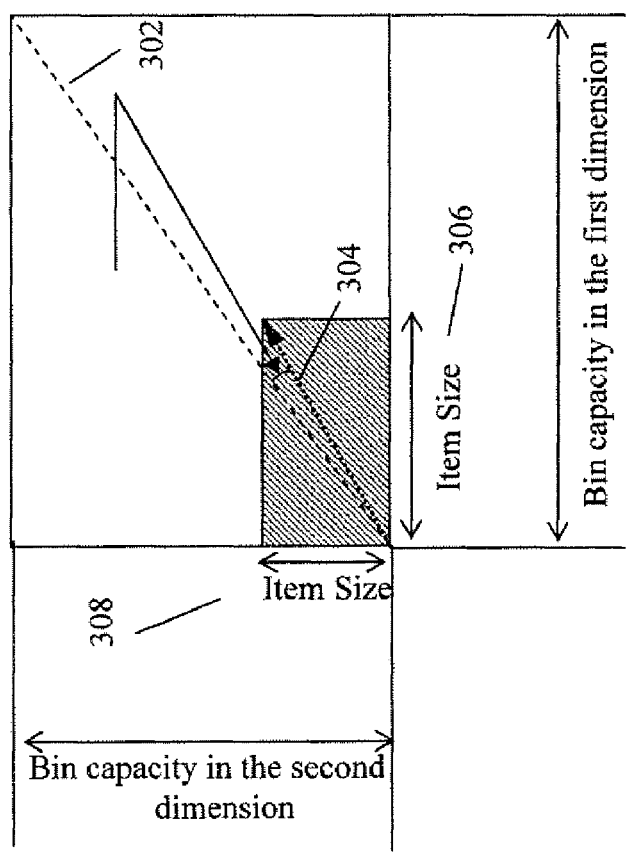
FIG. 3 illustrates assignment of a current item to a current bin, in accordance with an embodiment of the present invention.

FIG. 3 illustrates assignment of a current item to a current bin, in accordance with an embodiment of the present invention. As recited in the description of FIG. 2, server consolidation can be considered synonymous with the problem of accommodating multiple items in multiple bins optimally, where multiple items correspond to multiple resources and multiple bins correspond to multiple servers. In an embodiment of the present invention, the first step for packing multiple items in multiple bins includes selecting a current bin from the available multiple bins. Analogous to the bin vector of FIG. 2, a bin vector 302 is graphically illustrated that represents values of bin capacity in the first dimension and in the second dimension. Thereafter, a current item is selected from multiple available items and an item vector 304 is created by joining origin of a Cartesian co-ordinate system to the size of a current item. The item vector 304 is a slope representing values of item size in the first dimension and item size in the second dimension on the Cartesian co-ordinate system. In an example, first dimension of the item size may be height of the current item and second dimension of the item size may be width of the current item. In an embodiment of the present invention, for assigning the current item to the current bin, angle made by the bin vector 302 with the horizontal dimension of the Cartesian co-ordinate system is calculated. For the illustrated figure, firstly, angle made by the bin vector 302 with the horizontal dimension i.e. bin capacity in the first dimension is calculated by the formula:

$$\left| \frac{\text{Bin capacity in the first dimension}}{\text{Bin capacity in the second dimenison}} \right|$$

Secondly, angle made by the item vector 304 with the horizontal dimension i.e. item size in the first dimension is calculated by the formula:

$$\left| \frac{\text{Item size in the first dimension}}{\text{Item size in the second dimenison}} \right|$$

where item size in the first dimension is represented in the figure by item size 306 and item size in the second dimension is represented in the figure by item size 308. In an embodiment of the present invention, the angle that the bin vector 302 makes with the horizontal dimension represents the direction in which "growth in resource consumption" should ideally take place when packing items into the current bin for maximum utilization of the bin to happen. Hence, the maximum utilization of the bin occurs when the amount of deviation between the item vector 304 and the bin vector 302 is minimum. The current item is assigned to the current bin, if the item vector 304 has least deviation from the bin vector 302.

Figure 4:
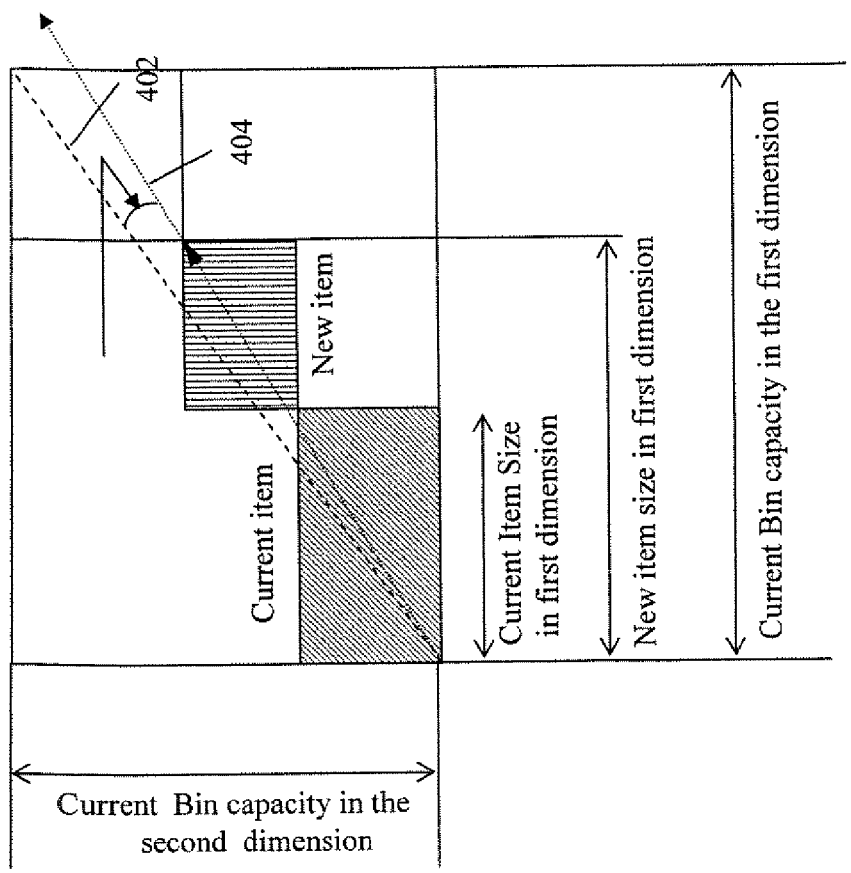
FIG. 4 illustrates assignment of a new item to a current bin based on deviation of the new item vector from the current bin vector.

FIG. 4 illustrates assignment of a new item to a current bin based on deviation of the new item vector from the current bin vector. As recited in the descriptions of FIG. 2 and FIG. 3, server consolidation can be considered synonymous with the problem of accommodating multiple items in multiple bins optimally, where multiple items correspond to multiple resources and multiple bins correspond to multiple servers. Current bin vector 402 represents values of current bin capacity in the first dimension and current bin capacity in the second dimension, for a bin selected from amongst the multiple bins. After assignment of the current item to the current bin (as explained in the description of FIG. 2), a new item is selected from the multiple items. Thereafter, a new item vector 404 is formed by joining the current item size with a new item size defining the new item. In an embodiment of the present invention, let bin capacities and item sizes are as follows:

Bin capacity in the first dimension=>$A_1$
Bin capacity in the second dimension=>$B_1$
Current item size in the first dimension=>$A_2$
Current item size in the second dimension=>$B_2$
New item size in the first dimension=>$A_3$
New item size in the second dimension=>$B_3$
Angle made by the current bin vector 402 with horizontal dimension of the Cartesian co-ordinate system is $$\left| \frac{A_1}{B_1} \right|.$$

Since, the new item vector 404 is formed by joining the current item size with the new item size, angle made by the new item vector 404 with the horizontal dimension of the Cartesian co-ordinate system is $$\left| \frac{A_2 + A_3}{B_2 + B_3} \right|.$$

In various embodiments of the present invention, deviation of the new item vector 404 from the current bin vector 402 is calculated by subtracting the angle made by the new item vector with the horizontal dimension from the angle made by the current bin vector 402 with the horizontal dimension.

Figure 5A:
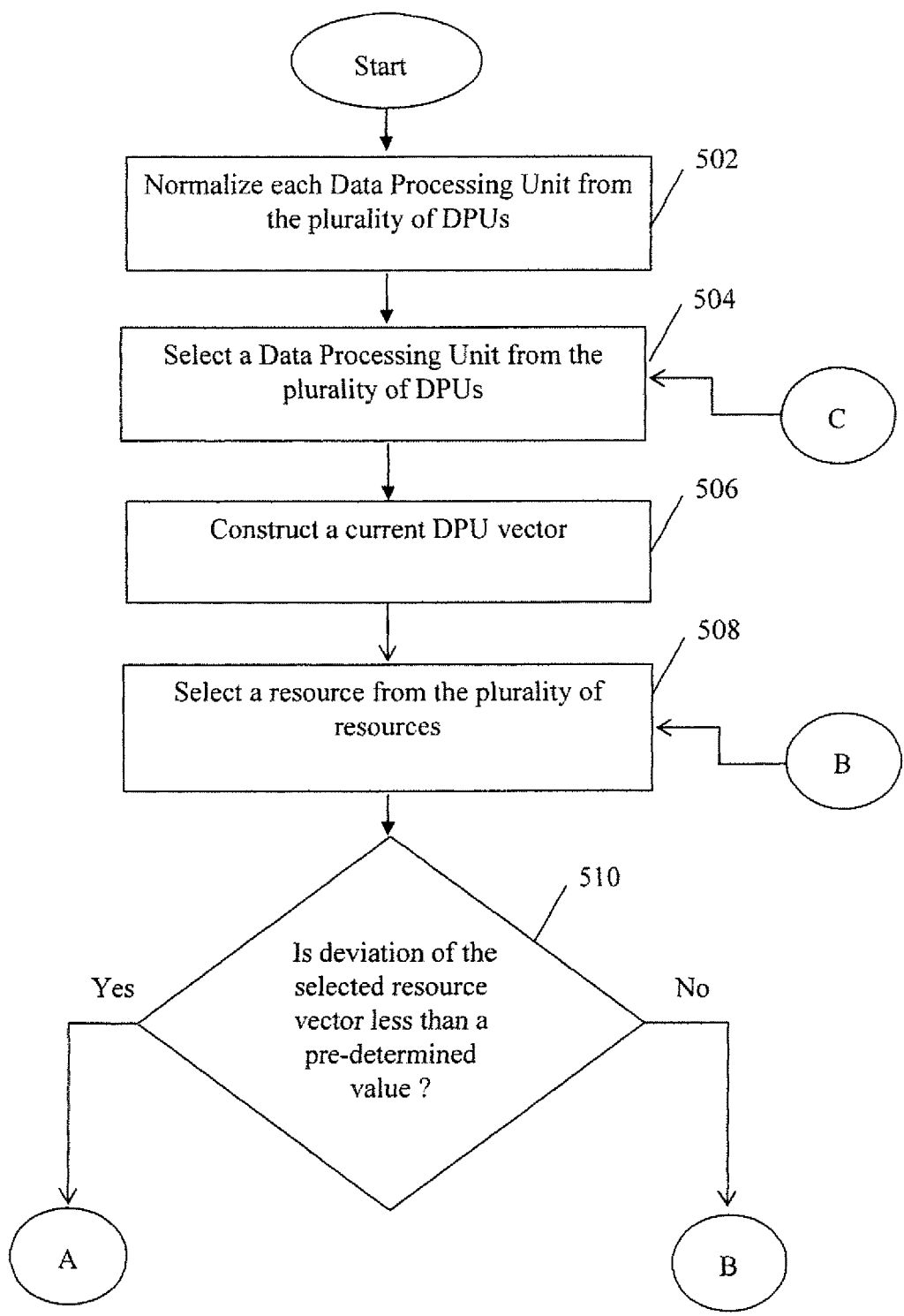
FIG. 5 illustrates a process flow diagram for assigning multiple resources to multiple data processing units, in accordance with an embodiment of the present invention.
Figure 5B:
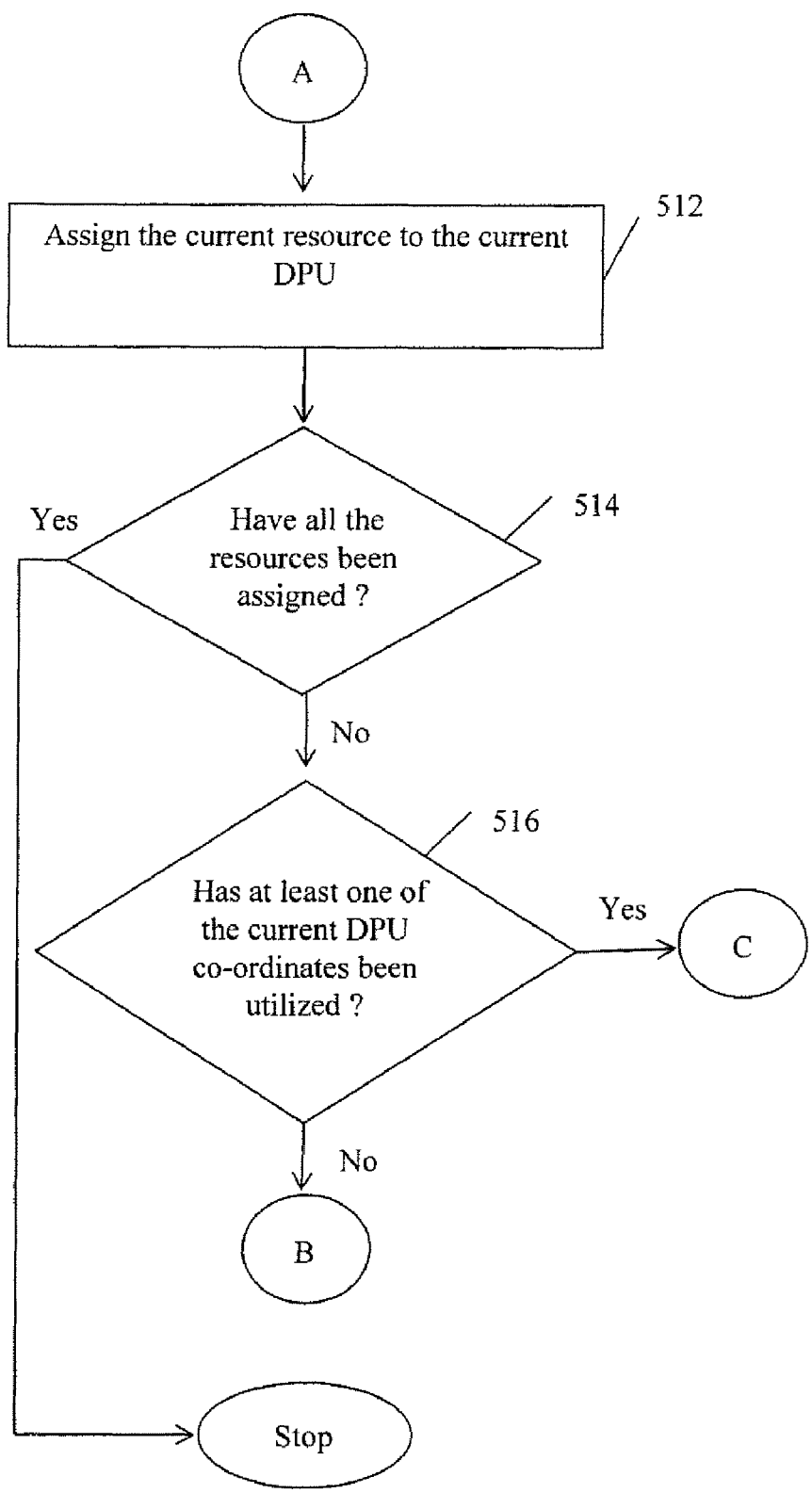

FIG. 5 illustrates a process flow diagram for assigning multiple resources to multiple data processing units, in accordance with an embodiment of the present invention. In the descriptions of FIGS. 2, 3, and 4, the process of assigning multiple items to multiple bins is explained. The process for assigning multiple resources to multiple DPUs is similarly described in the present figure. In an embodiment of the present invention, let the DPU and resource capacities be illustrated in two dimensions. In an example, a DPU capacity or a resource capacity may correspond to at least one of memory size of DPU, CPU capacity, and hard disk size. For the purpose of simplicity, let the DPU capacity and the resource capacity be represented by memory size in one dimension and CPU capacity in the other dimension. At step 502, each DPU from a plurality of DPUs is normalized. In an embodiment of the present invention, each DPU from the plurality of DPUs may exhibit a different CPU capacity. Hence, there is no suitable metric to compare resource utilizations of different DPUs based on their absolute CPU capacities. The processing capacities of DPUs may vary since the DPUs may have varying cores, sockets and clock frequency. For example, the CPU capacity of Proliant DL585 G1 is different from that of an E-Server Blade Center HS20. Hence, the normalization is done so that values of CPU capacities of the plurality of DPUs correspond with each other while resources are assigned to each DPU.

In an embodiment of the present invention, the normalization includes normalizing the CPU capacity of each DPU with respect to the CPU capacity of a reference DPU. Let the absolute CPU capacity of a DPU be absolute $CPU_i$. The normalized CPU capacity of each DPU can be calculated using the formula:

$$cpu_i = \frac{\text{absolute } CPU_i}{\text{equivalence\_factor}_i}$$

where equivalence_factor= (1 + (reference_server.cores − 1) ∗

(1 − 0.1 ∗ (reference − server.cores − 1)) / target_server.cores) ∗

(1 + (reference_server.socket − 1) ∗

(1 − 0.1 ∗ (reference_server.socket − 1)) / target_server.socket) ∗

(reference_server.*clockfreq* / target_server.*clockfreq*)

In the above formula:
reference_server.cores represent CPU cores of the reference DPU;
target_server.cores represent CPU cores of the selected DPU;
reference_server.socket and target_server.socket represent CPU sockets of the reference DPU and the selected DPU respectively; and
reference_server.clockfreq and target_server.clockfreq represent clock frequencies of the reference DPU and the selected DPU respectively.

At step 504, a current DPU is selected from the plurality of DPUs. In an embodiment of the present invention, a current DPU from the plurality of DPUs is selected based on volumes of the DPU. In an example, the DPUs are arranged in decreasing order of their volumes and a current DPU is selected in the order that the DPU having the highest volume is selected first.

At step 506, a current DPU vector is formed on a cartesian co-ordinate system, similar to the formation of a current bin vector in FIG. 2. In an embodiment of the present invention, the current DPU vector is formed by joining the origin of the co-ordinate system with the current DPU size. In an example, the current DPU size is represented in two dimensions by CPU capacity and memory size respectively. The angle formed by the current DPU vector with the horizontal dimension, in one embodiment is calculated by calculating $$\left| \frac{memory_i}{cpu_i} \right|.$$

Subsequently, at step 508, a current resource (j) is selected from a plurality of resources and a current resource vector is formed by joining the origin of the co-ordinate system with the current resource size. In an embodiment of the present invention, formation of the current resource vector is similar to the formation of the current item vector in FIG. 3. Then, an angle formed by the current resource vector with the horizontal dimension is calculated as $$\left| \frac{memory_j}{cpu_j} \right|$$

At step 510 it is determined whether the deviation of the current resource vector from the current DPU vector is less than a pre-determined value. In an example, deviation values of multiple resource vectors formed by multiple resources are stored and the pre-determined value is the minimum value of deviation amongst the multiple resource vectors. The deviation of the current resource vector is calculated by subtracting the angle formed by the current resource vector with the horizontal dimension $$\left| \frac{memory_j}{cpu_j} \right|$$

from the angle made by the current DPU vector with the horizontal dimension $$\left| \frac{memory_i}{cpu_i} \right|.$$

The amount of which the angle made by the current resource vector deviates from the angle made by the current DPU vector represents the DPU capacity going waste and is a measure of packing inefficiency.

Figure 6:
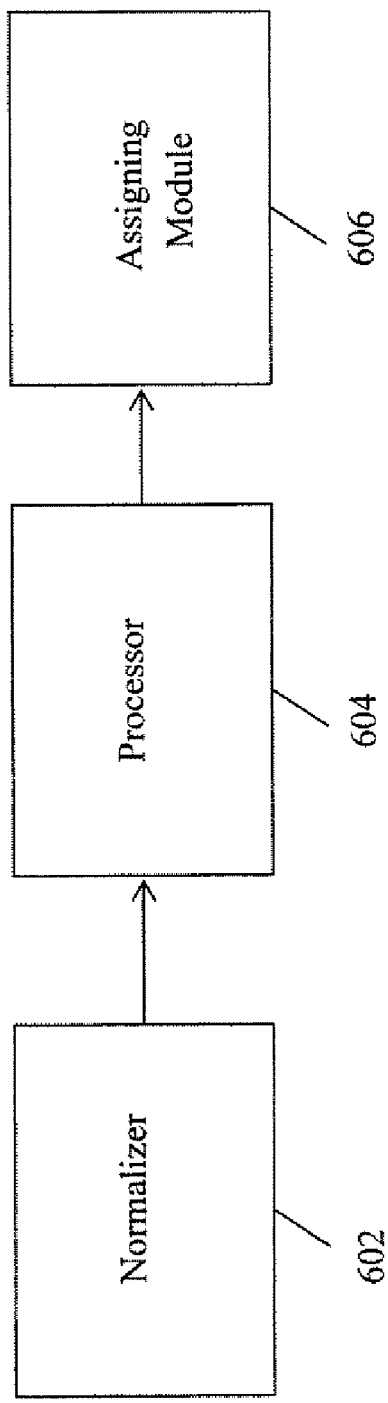
FIG. 6 illustrates a system for consolidating a plurality of resources on a plurality of data processing units.

If it is determined at step 510, that the deviation of the current resource vector is less than the pre-determined value, then at step 512, the current resource is assigned to the current DPU. At step 514, it is determined whether all the resources have been assigned. If it is determined at step 514 that all resources have been assigned, then the process flow terminates. Otherwise, it is determined at step 516 whether at least one of the current DPU co-ordinates been utilized at the user-defined level. In an example, utilization of one of the co-ordinates might denote complete utilization of either the memory size or the CPU capacity of the current DPU. If it is found that at least one of the current DPU co-ordinates have been utilized at the user-defined level, then the process flow is transferred to step 504, where a new DPU is selected from the plurality of DPUs. However, if both of the current DPU co-ordinates have not been completely utilized, the process flow is transferred to step 508, wherein a new resource is selected from the multiple resources. Upon selection of the new resource, deviation of the new resource vector from the current DPU vector is calculated by the formula $$\frac{\sum_{j \in J_i} memory_{j+}memory_j}{\sum_{j \in J_i} cpu_{j+}cpu_j}$$

where $$\sum_{j \in J_i} memory_{j+}memory_j$$

represents memory sizes of the resource assigned as well the current resource to be assigned to the current DPU, and $$\sum_{j \in J_i} cpu_{j+}cpu_j$$

represents cpu capacities of the resource assigned as well the current resource to be assigned to the current DPU FIG. 6 illustrates a system for consolidating a plurality of resources on a plurality of data processing units. The system 600 includes a normalizer 602, a processor 604 and an assigning module 606. The normalizer 602 is a software component that normalizes the DPUs to which resources are to be assigned, in an embodiment of the present invention. The normalization is done because different DPUs utilize different Central Processing Unit (CPU) capacities for processing the same resource. The processor 604 is configured to construct a multi-dimensional model illustrating DPU vectors and resource vectors, and calculating deviation of DPU vectors from resource vectors. In an embodiment of the present invention, the deviations are calculated to determine whether a resource should be allocated to a DPU. The assigning module 606 receives input from the processor 604 on the deviation of a DPU vector from a resource vector. Based on the value of the deviation, the assigning module assigns a resource to a DPU.

FIG. 7 illustrates a pseudo code for the algorithm for assigning multiple items to multiple bins. In an embodiment of the present invention, let $J_i$ be the set of items to be packed into bin i.

As shown in figure, at step 702, the bins are sorted in decreasing order of volumes (CPU*memory). For all the bins $$\left| \frac{memory_i}{cpu_i} \right|$$

value is then calculated. Then, at step 704, for all items j in the item list (item list always contains items that are yet to be allocated to the bins)

$$\left| \frac{\sum_{j \in J_i} memory_j + memory_j}{\sum_{j \in J_i} cpu_j + cpu_j} \right|$$

is calculated. In an embodiment of the present invention, the items in the item list are sorted in the descending sequence of $$\left| \left| \frac{memory_i}{cpu_i} \right| - \left| \frac{\sum_{j \in J_i} memory_j + memory_j}{\sum_{j \in J_i} cpu_j + cpu_j} \right| \right|.$$

Thereafter, if it is possible to pack the jth item in bin i then the item is allocated to the bin. The item-list is updated by removing the item from the list and Ji is also updated. The process then proceeds to step 2.

In case, none of the items in the item list can be packed into the bin, then the bin counter: i is incremented.

In an embodiment of the present invention, the algorithm described above is in two dimensions and can be extended to three dimensions. In this case we need to measure the angle made by the vector, say A, (with packed items' dimensions as its coordinates) with the capacity vector, say B, (with bin dimensions as its coordinates). For the sake of simplicity, lets denote the terms:

$$\left| \frac{\sum_{j \in J_i} memory_j + memory_j}{\sum_{j \in J_i} cpu_j + cpu_j} \right| \text{ and } \left| \left| \frac{memory_i}{cpu_i} \right| - \left| \frac{\sum_{j \in J_i} memory_j + memory_j}{\sum_{j \in J_i} cpu_j + cpu_j} \right| \right|$$

by $M_i$ and $\theta_i$ respectively.

Thus, if A is a vector with coordinates ($cpu_i$, $memory_i$, $disk_i$), then the angle between these two vectors A and B is given by $$\theta_i = \cos^{-1}\left| \frac{A \cdot B}{\|A\|\|B\|} \right|.$$

where A.B is the inner product of the two vectors A and B and, $\|A\|$ and $\|B\|$ defines the length of the vectors A and B.

In an embodiment of the present invention, $\|A\|$ is calculated as:

$$\sqrt{\left(\sum_{j \in J_i} memory_j + memory_j\right)^2 + \left(\sum_{j \in J_i} cpu_j + cpu_j\right)^2 + \left(\sum_{j \in J_i} disk_j + disk_j\right)^2}$$

In an embodiment of the present invention, $\|B\|$ is calculated as $$\sqrt{(memory_i)^2 + (cpu_i)^2 + (disk_i)^2}$$

Then, $\theta_i$ in the pseudo code in the figure is replaced with $$\theta_i = \cos^{-1}\left| \frac{A \cdot B}{\|A\|\|B\|} \right|.$$

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method of consolidating a plurality of resources on a plurality of data processing units (DPUs) in a data processing network, each of the plurality of resources being defined by a plurality of resource coordinates and each of the plurality of DPUs being defined by a plurality of DPU coordinates, wherein the plurality of DPU coordinates and the plurality of resource coordinates represent as separate dimensions of an orthotope in a multi-dimensional chart, the method comprising the steps of:

comparing DPU volumes corresponding to each of the plurality of DPUs in the data processing network to identify a DPU having a highest DPU volume among the plurality of DPU volumes compared, and, based on such comparison, selecting a first DPU having the identified highest DPU volume among the plurality of DPUs, wherein DPU volume for each of the plurality of DPUs is the product of at least two of the dimensions representing the corresponding set of DPU coordinates in the multi-dimensional chart;

determining a first DPU vector of the first DPU using first DPU coordinates from the plurality of DPU coordinates that define the first DPU, wherein the first DPU vector is connects an origin of the multi-dimensional chart to the first DPU coordinates in the multi-dimensional chart;

determining a first resource vector of a first resource from the plurality of resources using first resource coordinates from the plurality of resource coordinates, wherein the first resource vector connects origin of the multi-dimensional chart to the first resource coordinates in the multi-dimensional chart;

determining deviation between the first resource vector and the first DPU vector; and assigning the first resource to the first DPU, when the deviation between the first resource vector and the first DPU vector is minimum among the plurality of resources.

2. The method of claim 1 further comprising an initial step of normalizing each of the plurality of DPUs with a reference DPU.

3. The method of claim 2 further comprising the step of using an equivalence factor for normalizing each of the plurality of DPUs, wherein the equivalence factor is calculated using at least one of a plurality of parameters comprising Central Processing Unit (CPU) cores, CPU sockets, and clock frequency of each DPU and the reference DPU.

4. The method of claim 3 further comprising the step of selecting the reference DPU from the plurality of DPUs by a user.

5. The method of claim 1 further comprising the steps of:
determining a second resource vector of a second resource from the plurality of resources, wherein co-ordinates for the second resource vector are determined by joining first resource co-ordinates of the first resource and second resource co-ordinates of the second resource;
calculating deviation between the second resource vector and the first DPU vector; and
assigning the second resource to the first DPU when deviation between the second resource vector and the first DPU vector is minimum among the plurality of resources.

6. The method of claim 5 further comprising the step of assigning the second resource to the first DPU when a volume associated with the second resource is less than the volume amount left from a first DPU volume after assigning the first resource to the first DPU, wherein the first DPU volume is calculated using memory size and CPU capacity of the first DPU.

7. The method of claim 1 further comprising selecting a second DPU from the plurality of DPUs for assigning resources when at least one of the first DPU co-ordinates of the first DPU has been utilized to a user defined level, wherein the first DPU co-ordinates represent at least one of memory size of the first DPU, a central processing unit (CPU) capacity of the first DPU, a data processing network I/O speed, and a first DPU I/O speed.

8. The method of claim 1, wherein the dimensions of the multi-dimensional chart comprise dimensions representing a memory size and a central processing unit (CPU) capacity of the first DPU.

9. The method of claim 1, wherein the deviation between the first resource vector and the first DPU vector is determined using their vector dot product.

10. The method of claim 1, wherein determining deviation between the first resource vector and the first DPU vector comprises:
calculating the angle made by the first resource vector with a reference axis of the multi-dimensional chart;
calculating the angle made by the DPU vector with the reference axis; and
subtracting the angle made between the first resource vector from the angle made by the first DPU vector.

11. The method of claim 1 comprising the initial steps of:
generating a multi-dimensional chart having dimensions corresponding to the plurality of DPU coordinates and the plurality of resource coordinates; and
representing the plurality of DPUs and plurality of resources as orthotopes within the multi-dimensional chart.

12. The method of claim 1 wherein each of the plurality of resources is defined by at least three resource coordinates, each of the plurality of DPUs is defined by at least three DPU coordinates, and the multi-dimensional chart correspondingly comprises at least three dimensions.

13. A system of consolidating a plurality of resources on a plurality of data processing units (DPUs) in a data processing network, each of the plurality of resources being defined by a plurality of resource coordinates and each of the plurality of DPUs being defined by a plurality of DPU coordinates, wherein the plurality of DPU coordinates and the plurality of resource coordinates represent separate dimensions of an orthotope in a multi-dimensional chart, the system comprising:

a normalizer configured to normalize each of the plurality of DPUs with a reference DPU, wherein the reference DPU is selected by a user from the plurality of DPUs in the data processing network;
a processor configured to:
construct the multi-dimensional chart illustrating DPU vectors and resource vectors, wherein a DPU vector for each DPU is determined by connecting an origin of the multi-dimensional chart and DPU coordinates selected from the plurality of DPU coordinates that define said DPU in the multi-dimensional chart, and a resource vector for each resource is determined by connecting the origin of the multi-dimensional chart to resource coordinates selected from the plurality of resource coordinates that define said resource in the multi-dimensional chart;
compare DPU volumes corresponding to each of the plurality of DPUs in the data processing network and select based on such comparison, DPUs in decreasing order of DPU volume, wherein DPU volume for each of the plurality of DPUs is the product of at least two of the dimensions representing the corresponding set of DPU coordinates in the multi-dimensional chart; and
determine deviation between DPU vectors and resource vectors; and
an assigning module configured to assign a first resource to a first DPU based on the value of the deviation between the first DPU vector- and each of the resource vectors.

14. The system of claim 13, wherein the processor determines deviation between a DPU vector and a resource vector by subtracting an angle made by the resource vector with a reference axis of the multi-dimensional chart from an angle made by a DPU vector with the reference axis.

15. The system of claim 13, wherein the assigning module assigns the first resource from the plurality of resources to the first DPU when deviation of the first resource vector from the first DPU vector is least among deviation of each of the plurality of resource vectors.

16. The system of claim 15, wherein the assigning module assigns a second resource from the plurality of resources to the first DPU, the second resource having a second resource vector formed by joining first resource co-ordinates of the first resource and second resource co-ordinates of the second resource, from the first DPU vector, among the remaining plurality of resources.

17. The system of claim 13, wherein the normalizer normalizes each of the plurality of DPUs using an equivalence factor, wherein the equivalence factor is calculated using at least one of a plurality of parameters comprising CPU cores, CPU sockets, and clock frequency of the reference DPU.

18. The system of claim 13, wherein the processor determines deviation between a DPU vector and a resource vector using their vector dot product.

19. The system of claim 13, wherein each of the plurality of resources is defined by at least three resource coordinates, each of the plurality of DPUs is defined by at least three DPU coordinates, and the multi-dimensional chart correspondingly comprises at least three dimensions.

20. A computer program product comprising a non-transitory computer usable medium having a computer readable program code embodied therein for consolidating a plurality of resources on a plurality of data processing units (DPUs) in a data processing network, each of the plurality of resources being defined by a plurality of resource coordinates and each of the plurality of DPUs being defined by a plurality of DPU coordinates, wherein the plurality of DPU coordinates and the plurality of resource coordinates represent separate dimensions of an orthotope in a multi-dimensional chart, the computer readable program code causing a processor to perform a method comprising:

comparing DPU volumes corresponding to each of the plurality of DPUs in the data processing network to identify a DPU having a highest DPU volume among the plurality of DPU volumes compared, and, based on such comparison, selecting a first DPU having the identified highest DPU volume among the plurality of DPUs wherein DPU volumes for each of the plurality of DPUs is the product of at least two of the dimensions representing the corresponding set of DPU coordinates in the multi-dimensional chart;

determining a first DPU vector of the first DPU using first DPU coordinates from the plurality of DPU coordinates that define the first DPU, wherein the first DPU vector connects origin of the multi-dimensional chart to the first DPU coordinates in the multi-dimensional chart;

determining a first resource vector of a first resource from the plurality of resources using first resource coordinates from the plurality of resource coordinates, wherein the first resource vector connects origin of the multi-dimensional chart to the first resource coordinates in the multi-dimensional chart;

determining deviation between the first resource vector and the first DPU vector; and assigning the first resource to the first DPU, when the deviation between the first resource vector and the first DPU vector is minimum among the plurality of resources.

21. The computer program product of claim 20 further comprising initially normalizing each of the plurality of DPUs with a reference DPU.

22. The computer program product of claim 21 further comprising using an equivalence factor for normalizing each of the plurality of DPUs, wherein the equivalence factor is calculated using at least one of a plurality of parameters comprising Central Processing Unit (CPU) cores, CPU sockets, and clock frequency of each DPU and the reference DPU.

23. The computer program product of claim 22 further comprising selecting the reference DPU from the plurality of DPUs by a user.

24. The computer program product of claim 20 further comprising:

determining a second resource vector of a second resource from the plurality of resources, wherein co-ordinates for the second resource vector are determined by joining the first resource co-ordinates of the first resource and second resource co-ordinates of the second resource;

determining deviation between the second resource vector and the first DPU vector; and assigning the second resource to the first DPU when deviation between the second resource vector and the first DPU vector is minimum among the plurality of resources.

25. The computer program product of claim 24 further comprising assigning the second resource to the first DPU when a volume associated with the second resource is less than the volume amount left from a first DPU volume after assigning the first resource to the first DPU, wherein the first DPU volume is calculated using memory size and CPU capacity of the first DPU.

26. The computer program product of claim 20 further comprising selecting a second DPU from the plurality of DPUs for assigning resources when at least one of the first DPU co-ordinates of the first DPU has been utilized to a user defined level, wherein the first DPU co-ordinates represent at least one of memory size of the first DPU, a central processing unit (CPU) capacity of the first DPU, a data processing network I/O speed, and a first DPU I/O speed.

27. The computer program product of claim 20, wherein the deviation between the first resource vector and the first DPU vector is determined using their vector dot product.

28. The method of claim 20, wherein determining deviation between the first resource vector and the first DPU vector comprises:

calculating the angle made by the first resource vector with a reference axis of the multi-dimensional chart;

calculating the angle made by the DPU vector with the reference axis; and subtracting the angle between the first resource vector from the angle made by the first DPU vector.

29. The computer program product of claim 20, further comprising:

generating a multi-dimensional chart having dimensions corresponding to the plurality of DPU coordinates and the plurality of resource coordinates; and representing the plurality of DPUs and plurality of resources as orthotopes within the multi-dimensional chart.

30. The computer program product of claim 20, wherein each of the plurality of resources is defined by at least three resource coordinates, each of the plurality of DPUs is defined by at least three DPU coordinates, and the multi-dimensional chart correspondingly comprises at least three dimensions.

* * * * *

UNITED STATES PATENT AND TRADEMARK OFFICE
CERTIFICATE OF CORRECTION

PATENT NO.        : 8,402,138 B2
APPLICATION NO.   : 12/420225
DATED             : March 19, 2013
INVENTOR(S)       : Sumit Kumar Bose and Srikanth Sundarrajan Page 1 of 2

It is certified that error appears in the above-identified patent and that said Letters Patent is hereby corrected as shown below:

Title Page:

Item (57) third line of ABSTRACT, "is" should read -- are --.

In the Specification:

Column 1, line 16, after "access" insert -- is --.
Column 1, line 20, before "number" insert -- the --.
Column 1, line 27, "times" should read -- time --.
Column 1, line 34, after "into" insert -- a --.
Column 1, line 54, "consolidates" should read -- consolidate --.
Column 1, line 61, "is" should read -- are --.
Column 2, line 17, "for includes" should read -- include --.
Column 2, line 28, "have" should read -- has --.
Column 2, line 56, "is" should read -- are --.
Column 2, line 64, "implements" should read -- implement --.
Column 3, line 1, "provides" should read -- provide --.
Column 3, line 5, "provides" should read -- provide --.
Column 3, line 9, "provides" should read -- provide --.
Column 3, line 25, "is" should read -- are --.
Column 3, line 34, "would" should read -- 34 --.
Column 3, line 55, before "Central" insert -- the --.
Column 3, line 56, after "time" insert -- , --.
Column 3, line 59, after "Since" insert -- , --.
Column 4, line 14, after "in" insert -- the --.
Column 4, line 17, "dimensions" should read -- dimension --.
Column 4, line 49, after "joining" insert -- the --.
Column 4, line 57, before "angle" insert -- an --.
Column 4, line 59, before "angle" insert -- the --.
Column 5, line 1, before "angle" insert -- the --.
Column 5, line 38, after "invention," delete "let".

Signed and Sealed this
Fourteenth Day of April, 2015

Michelle K. Lee
*Director of the United States Patent and Trademark Office*

Column 5, line 55, before "angle" insert -- the --.
Column 7, line 1, "cartesian" should read -- Cartesian --.
Column 7, line 9, after "embodiment" insert -- , --.
Column 7, line 56, after "510" -- , --.
Column 7, line 64, after "co-ordinates" insert -- has --.
Column 8, line 1, "have" should read -- has --.
Column 8, line 34, "cpu" should read -- CPU --.
Column 9, line 27, after "then" insert -- in --.
Column 9, line 33, "lets" should read -- let's --.
Column 9, line 43, "cpu" should read -- CPU --.
Column 9, line 52, "defines" should read -- define --.

In the Claims:

Column 10, line 50, after "connects" insert -- an --.
Column 12, line 19, after "select" insert -- , --.
Column 12, line 29, after "vector" delete "-".
Column 13, line 19, after "connects" insert -- an --.
Column 13, line 24, after "connects" insert -- an --.